(12) United States Patent
Prinz et al.

(10) Patent No.: US 7,498,786 B2
(45) Date of Patent: Mar. 3, 2009

(54) DIGITAL CONTROL OF SWITCHING VOLTAGE REGULATORS

(75) Inventors: Francois X. Prinz, Henderson, NV (US); Sridhar Kotikalapoodi, Santa Clara, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 580 days.

(21) Appl. No.: 10/725,699

(22) Filed: Dec. 1, 2003

(65) Prior Publication Data

US 2005/0116698 A1 Jun. 2, 2005

(51) Int. Cl.
*G05F 1/575* (2006.01)

(52) U.S. Cl. .......................... 323/283; 323/284

(58) Field of Classification Search .................. 323/283, 323/282, 351, 284, 285, 241, 243, 246; 700/43, 700/46
See application file for complete search history.

(56) References Cited

U.S. PATENT DOCUMENTS

| | | | | |
|---|---|---|---|---|
| 4,387,399 A | * | 6/1983 | Novotny | 348/730 |
| 5,189,601 A | * | 2/1993 | Sellers | 363/17 |
| 5,912,551 A | * | 6/1999 | Corsi et al. | 323/283 |
| 6,225,794 B1 | * | 5/2001 | Criscione et al. | 323/283 |
| 6,356,063 B1 | * | 3/2002 | Brooks | 323/284 |
| 6,377,428 B1 | * | 4/2002 | Ogasawara | 361/86 |
| 6,593,864 B1 | * | 7/2003 | Reilly | 341/119 |
| 6,621,256 B2 | * | 9/2003 | Muratov et al. | 323/282 |
| 6,696,882 B1 | * | 2/2004 | Markowski et al. | 327/531 |
| 6,879,138 B2 | * | 4/2005 | Dinh et al. | 323/284 |
| 2002/0171985 A1 | * | 11/2002 | Duffy et al. | 361/90 |
| 2004/0239300 A1 | * | 12/2004 | Sutardja et al. | 323/283 |
| 2006/0044845 A1 | * | 3/2006 | Fahlenkamp et al. | 363/21.15 |

* cited by examiner

*Primary Examiner*—Akm E Ullah
*Assistant Examiner*—Harry Behm
(74) *Attorney, Agent, or Firm*—Sidley Austin LLP

(57) ABSTRACT

A digital control system and method for use in switching type voltage regulators measures the rate of the change and the magnitude of the output voltage to change not only the pulse width but also the frequency of the pulses. A voltage regulator according to the present invention creates a more stable output voltage and responds more quickly to sudden changes in current load than prior analog and digitally controlled systems.

3 Claims, 8 Drawing Sheets

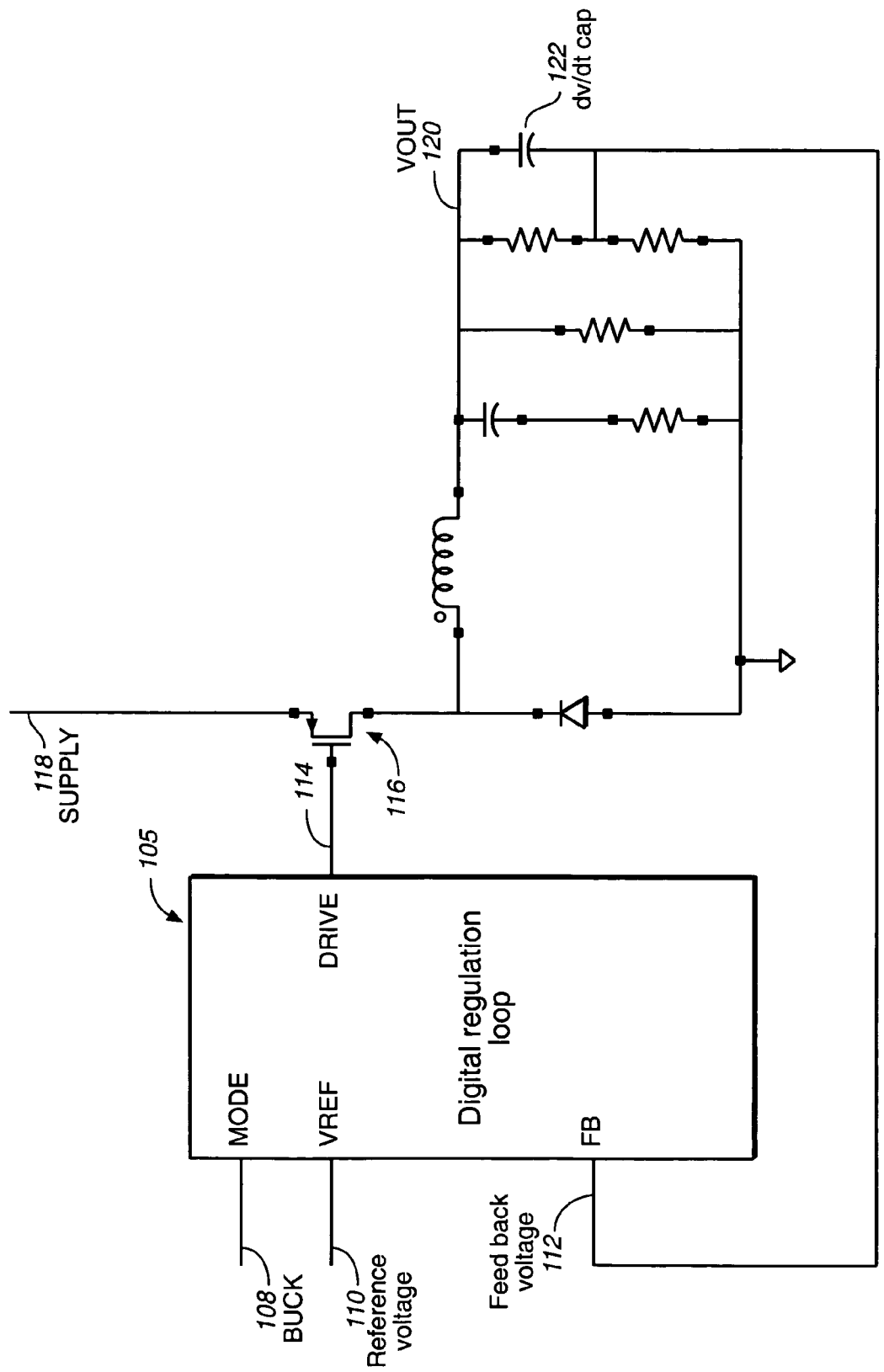
FIG._1A

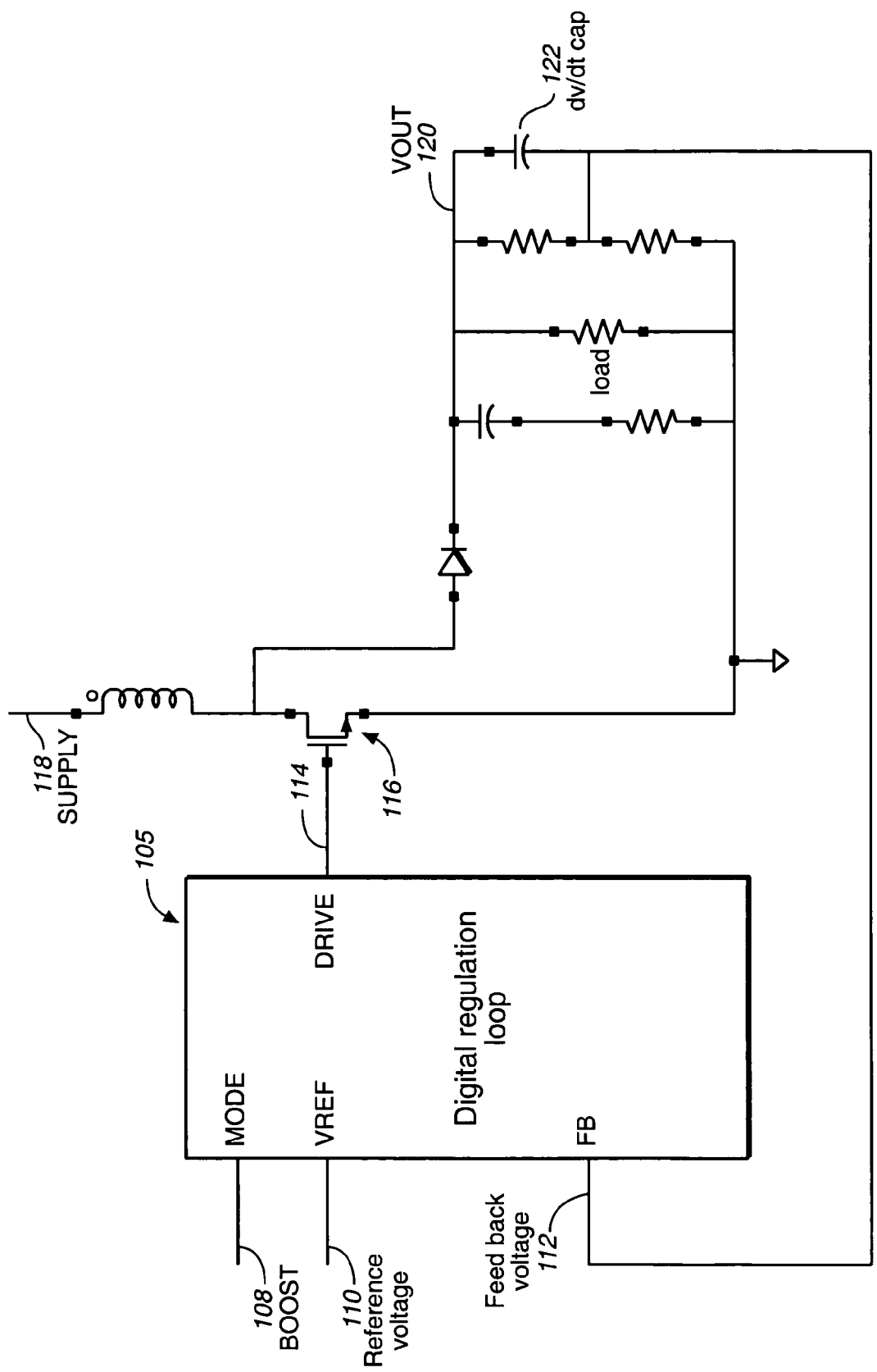
FIG._1B

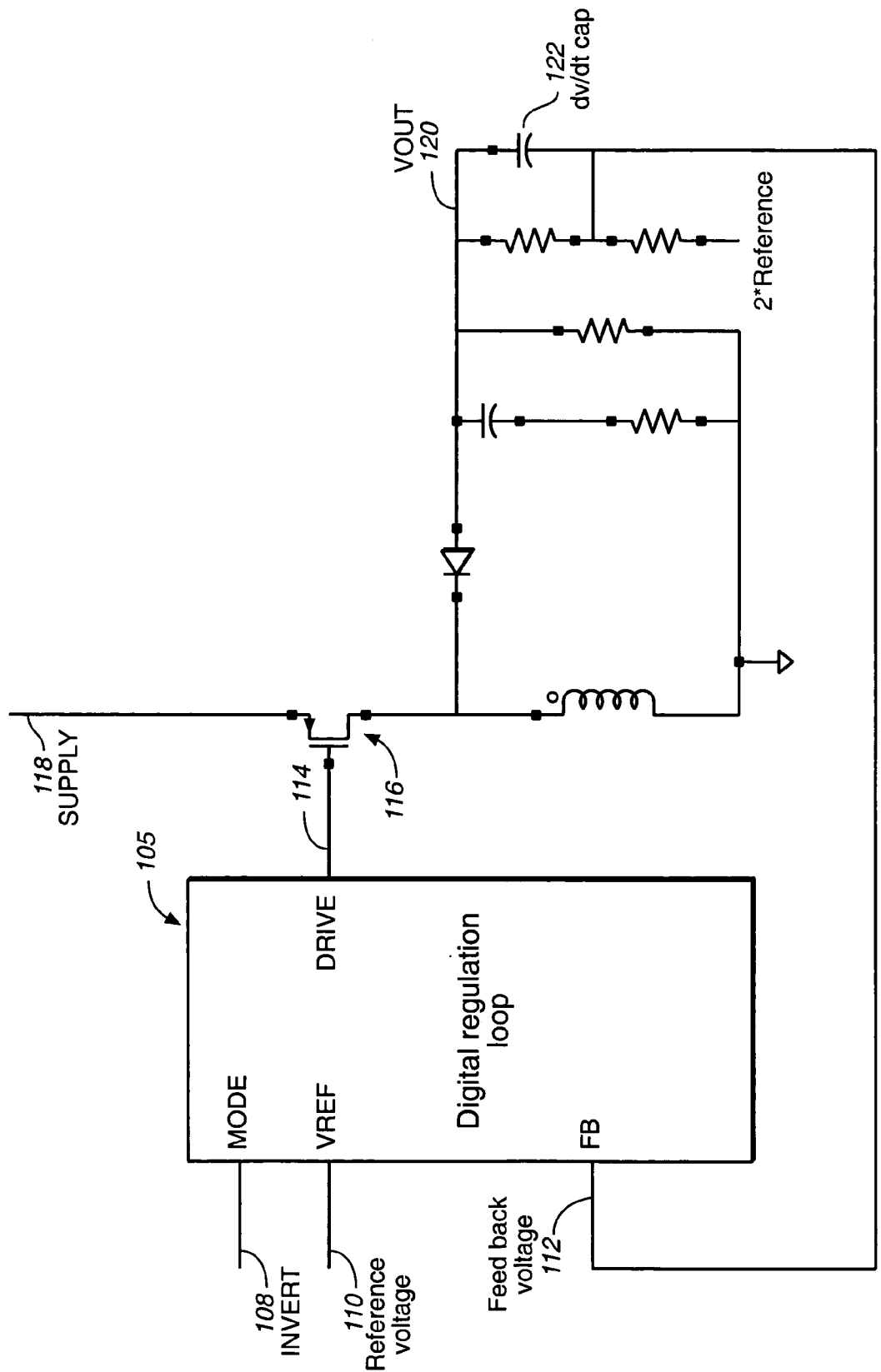
FIG._1C

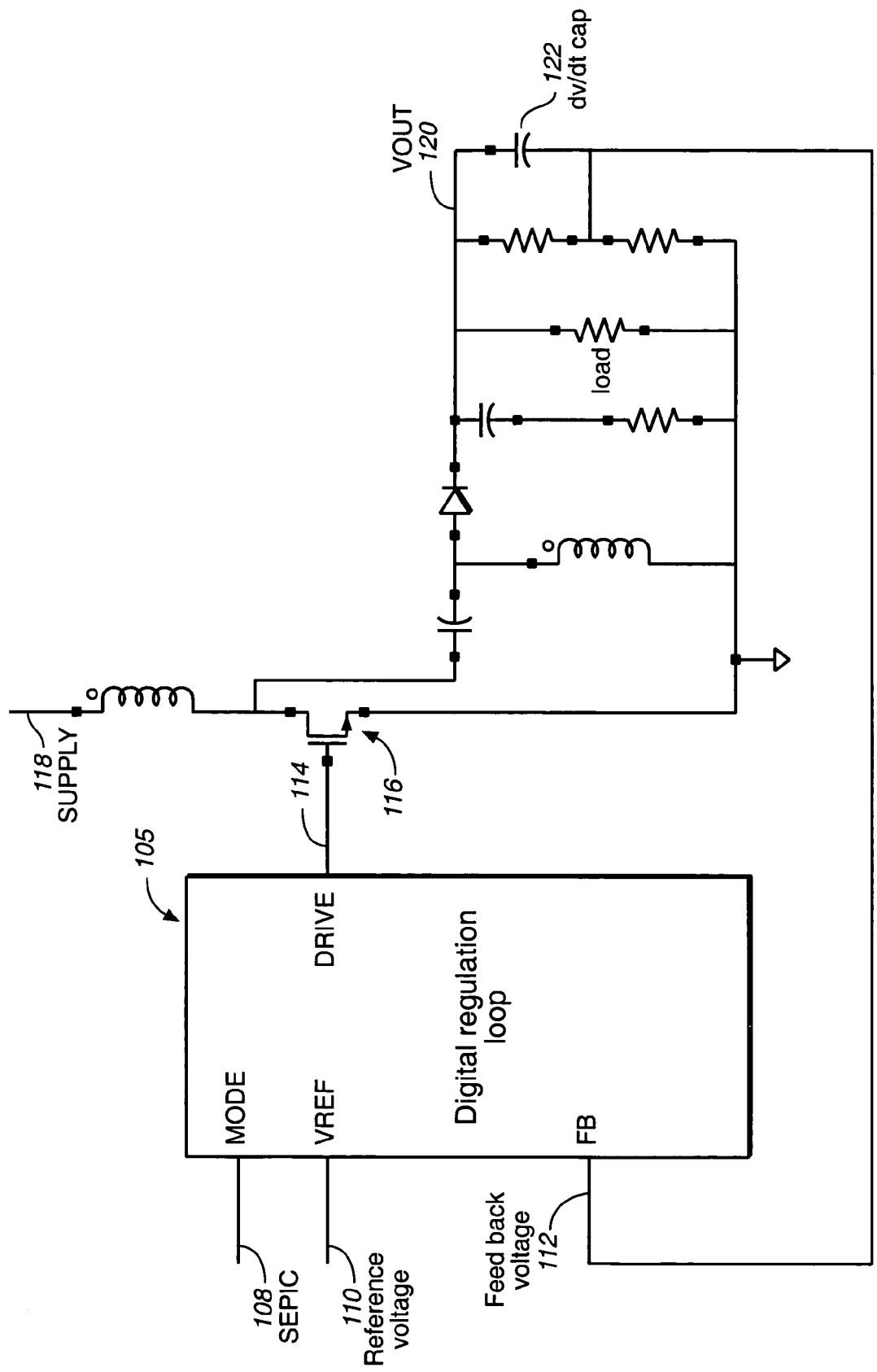
FIG._1D

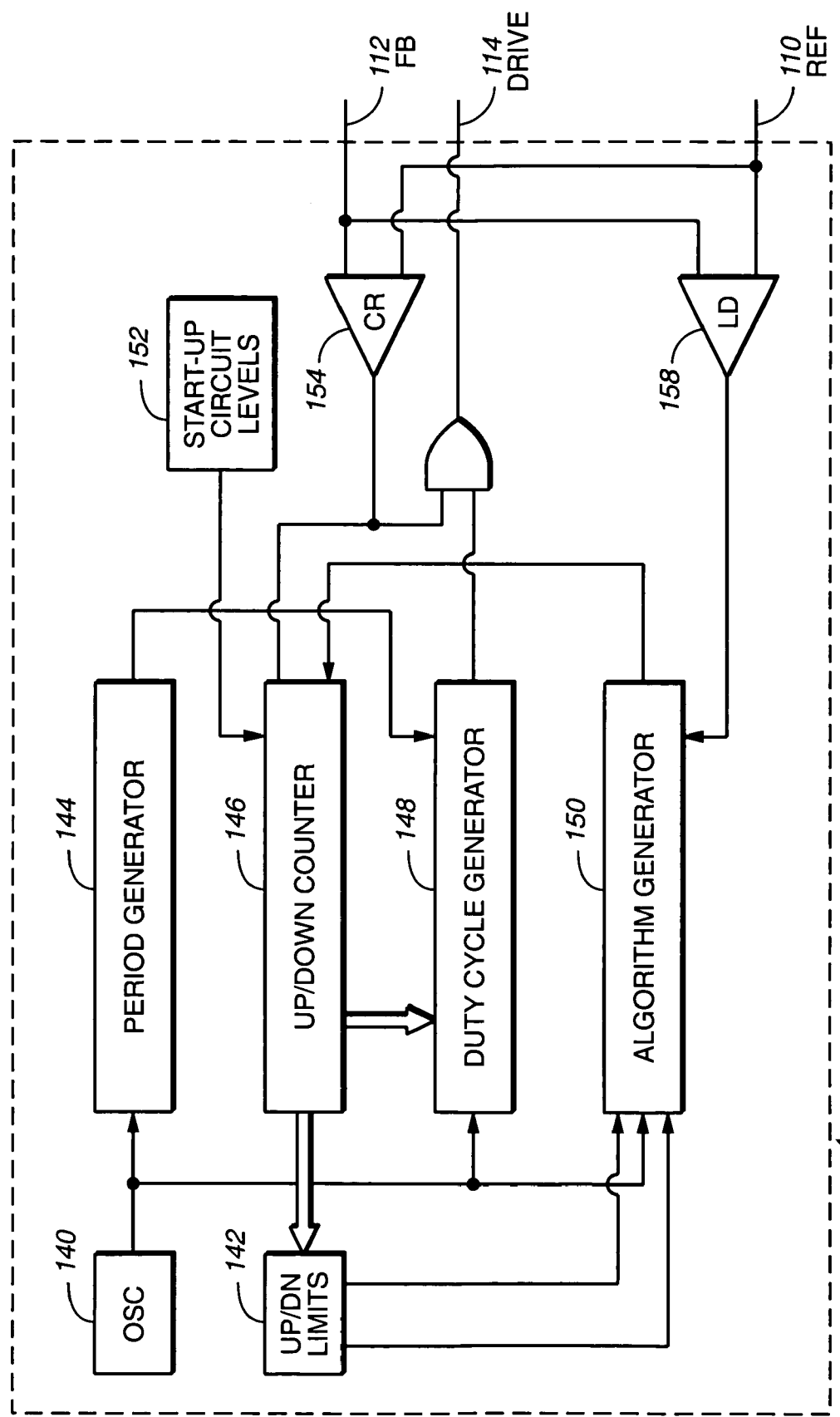
FIG._2

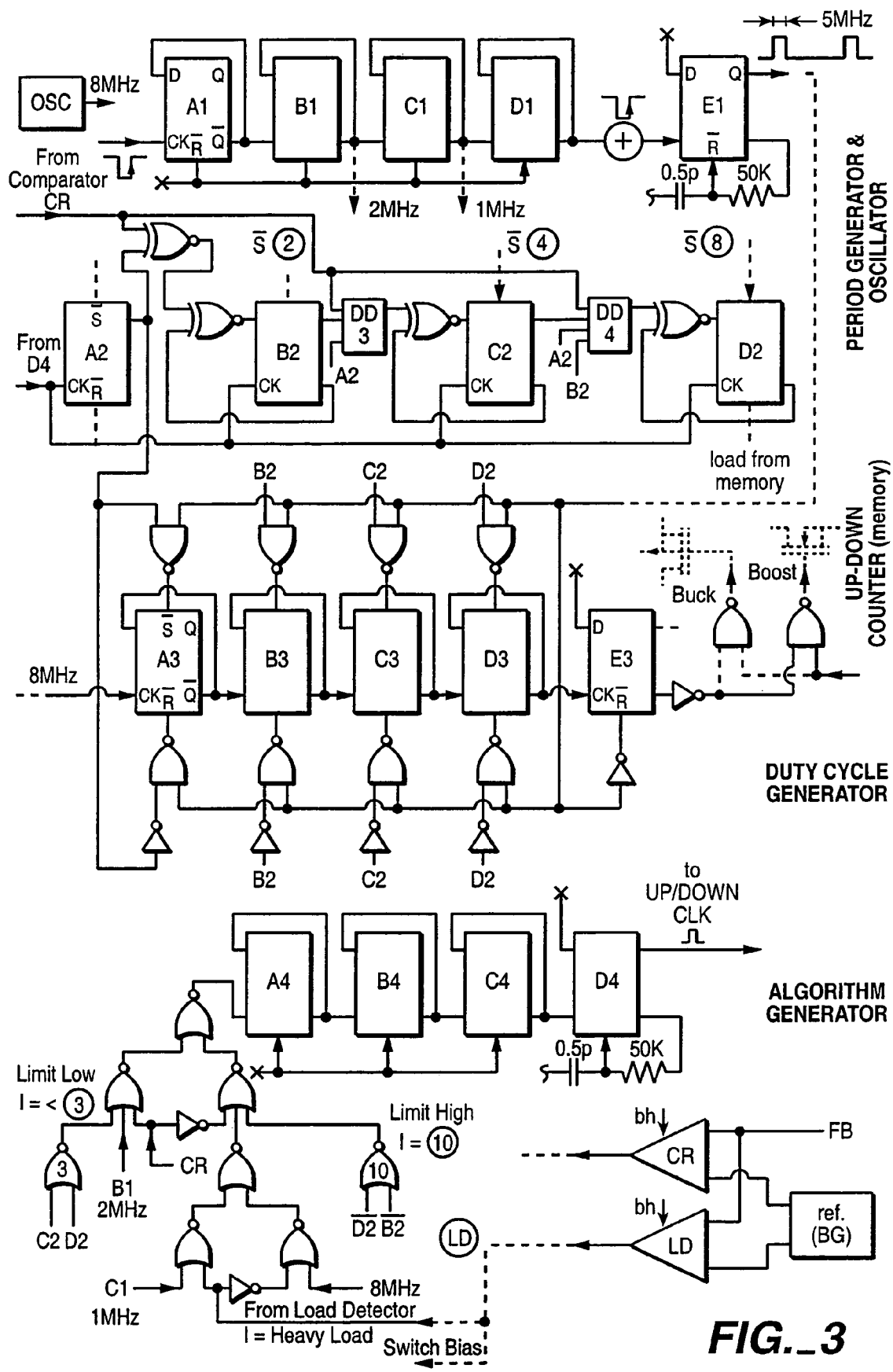
FIG._3

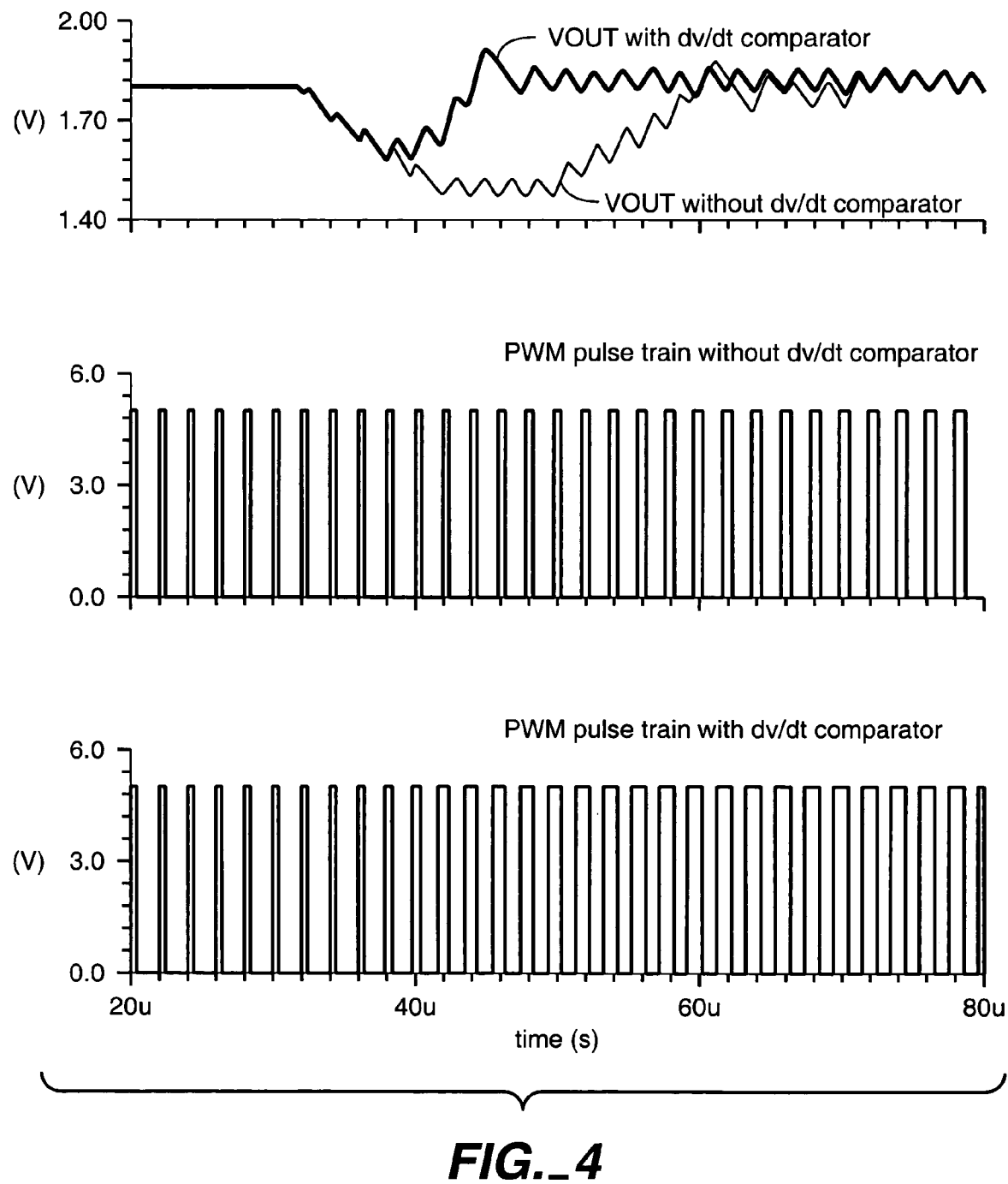
FIG._4

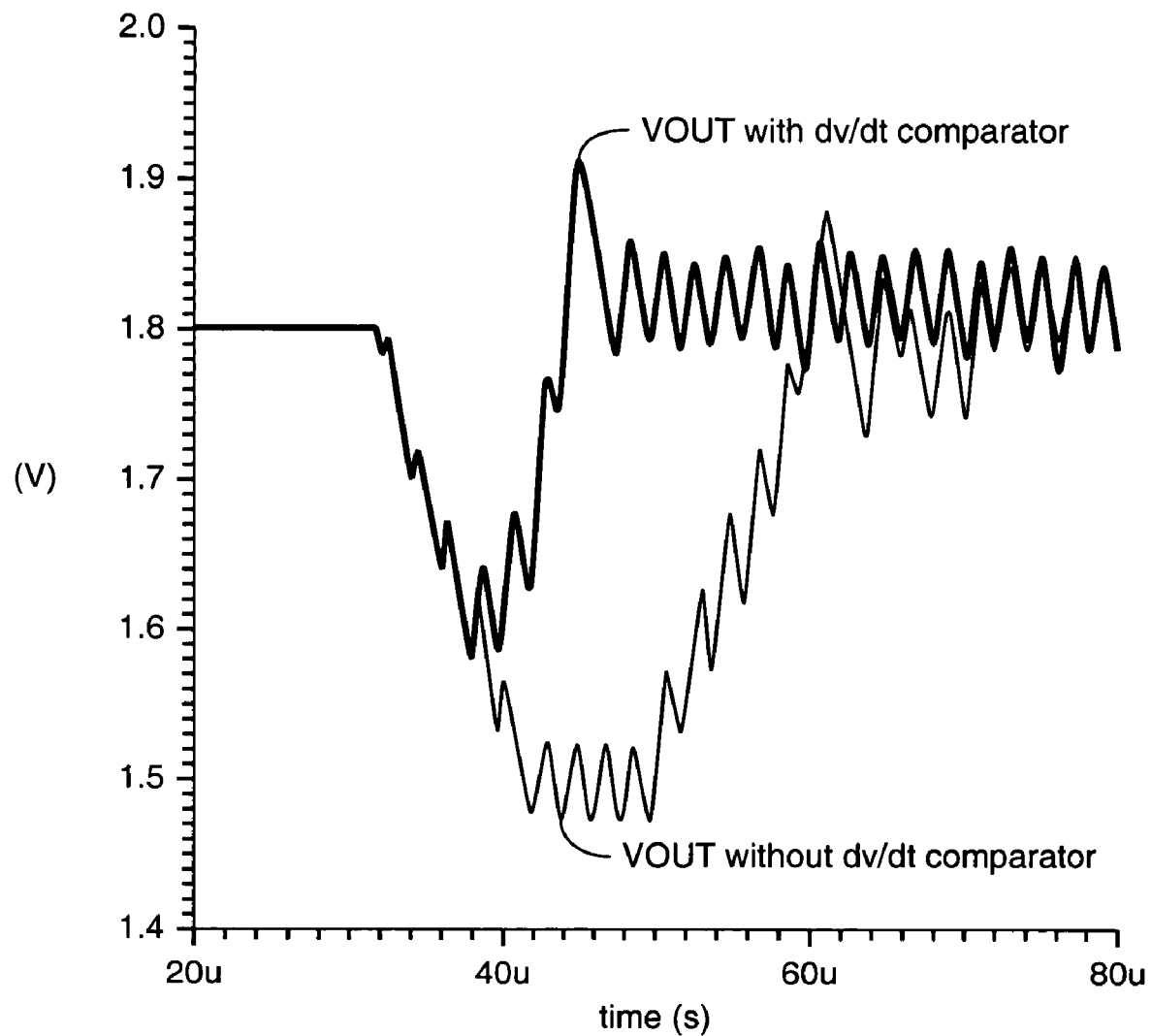
FIG._5

DIGITAL CONTROL OF SWITCHING VOLTAGE REGULATORS

BACKGROUND (a) Field of the Invention

The present invention relates generally to switching power supplies and more particularly to digitally controlled voltage converters.

(b) Related Art

In low power applications such as portable electronic devices, a buck inverter or boost converter, is generally utilized depending on the voltage of the power source and the voltage needed to power the circuitry of the portable electronic device.

For example, a portable electronic device may be designed to be powered from a lithium battery that produces a supply anywhere between 4.2 volts and 3.0 volts, while CMOS integrated circuits in the device require a supply of 1.8 volts to 2.5 volts. In this example, a buck converter would be utilized to step down the battery voltage to a controlled 1.8 or 2.5 volts. If, however, the same portable electronic device were designed to be powered from a 1.5 volt battery, the device would include a boost converter to step up the 1.5 volts to 1.8 or 2.5 volts.

Switching voltage converters, alternately store and output energy. Energy from the input voltage is temporarily stored in an inductor during each switching cycle. Generally, a switch driven by a series of pulses controls how much of the energy is output. A filter is used to smooth the output into a DC voltage. The output DC voltage can be higher or lower than the input voltages. The output DC voltage may also be negative with respect to the input voltage.

Switching voltage converters operate in either a discontinuous mode or a continuous mode. In the discontinuous mode, controllers completely de-energize the inductor before the end of every switching cycle. Thus, there is no current in the inductor at the start of every switching cycle in the discontinuous mode. In the continuous mode, controllers do not completely de-energize the inductor before the end of every switching cycle. Thus, the current in the inductor never reaches a point where there is no current in the inductor in the continuous mode.

The output of a switching regulator is determined in part by the duty (cycle) ratio. The duty ratio is equal to the time period in which the switch is "on" divided by the time period of the switching cycle (D=Ton/T). The switching cycle time period is equal to the time period in which the switch is "on" plus the time period in which the switch is "off" (T=Ton+Toff).

There are four basic topologies of switching regulators: the buck converter, the boost converter, the non-inverting buck-boost converter, and the inverting buck-boost converter or inverter. The output voltage of the buck converter is equal to the input voltage multiplied by the duty ratio (Vout=Vin*D). Thus, the output voltage of the buck inverter cannot be greater than the input voltage. Also, the output voltage of the buck converter cannot be negative.

In the boost converter (or "step-up" converter), the output voltage is equal to the input voltage times the switching cycle time period divided by the time period in which the switch is off (Vout=Vin*T/Toff). Thus, the output voltage of the boost converter cannot be less than the input voltage. Also, the output voltage of the boost converter cannot be negative with respect to the input voltage.

For the buck-boost and single ended primary inductor converter ("SEPIC"), the output voltage is equal to the input voltage multiplied by the ratio of the time period in which the switch is on to the time period in which the switch is off (Vout=−Vin*Ton/Toff). Thus, the output voltage has a magnitude that is either stepped-up or stepped-down from the input voltage as determined by the duty ratio.

SUMMARY

The present invention can be used in many different voltage converter topologies and configurations. The digital control of the present invention can be used in buck, boost, or buck-boost configurations, SEPIC, or inverter topologies, to name a few.

The present invention results in a simpler controller that provides faster transient response and makes the control loop easier to stabilize than prior fully analog regulators operating in PWM mode. Furthermore, other types of prior regulators like hysteretic mode regulators cannot be used in boost configurations because of current build-up in the coil.

Another advantage of the present invention is less signal ripple than other prior designs like constant ON time or constant OFF time converters. In analog pulse width modulators ("PWM"), every time the clock frequency is changed, the error amplifier compensation needs to be redesigned. In the present invention all the timing is scaled from the system clock. Hence the same controller can be used with different system clock frequencies.

In respect to prior designs, the present invention is less manufacturing process dependent because of the digital control. Also, the present invention controls both the PWM and a pulse frequency modulation ("PFM") at the same time.

Prior digital controller designs operate in PWM and hence the output voltage accuracy/resolution is limited by the number of levels assigned to the duty cycle of the PWM pulses. As the number of levels are increased the output voltage accuracy increases but the device size starts increasing rapidly. In the present invention, the PWM pulses are ANDed with a comparator output. As soon as the output voltage reaches the required level, the comparator blocks the PWM pulses right away, hence giving infinite resolution of the duty cycle even with the limited resolution of the PWM pulses.

BRIEF DESCRIPTION OF THE FIGURES

FIG. 1A illustrates an buck mode regulator embodying the present invention.

FIG. 1B illustrates a boost mode regulator embodying the present invention.

FIG. 1C illustrates an inverter mode regulator embodying the present invention.

FIG. 1D illustrates a SEPIC mode regulator embodying the present invention.

FIG. 2 illustrates digital controller 105 seen in FIGS. 1A-1D.

FIG. 3 illustrates a specific implementation of an embodiment of the components of digital controller 105.

FIG. 4 is a chart of the output voltage and pulse train over time produced by an embodiment of the present invention.

FIG. 5 is a large scale chart of the output voltage over time of an embodiment of the present invention as compared to prior standard designs.

DETAILED DESCRIPTION

In prior converters operating in voltage mode PWM, control loop compensation is cumbersome because of the double pole of the output LC filter. In addition to this, for boost and buck-boost modes there is right-half plane zero, which degrades the phase margin further and makes voltage mode operation virtually impossible. In order to get rid of the double pole of the output LC filter, current mode PWM is often used. In this mode current in the coil is sensed and this information is used to modulate the pulse width. In the current mode converters, the LC double pole is shifted to a single pole caused by the load resistance and output capacitance, Even in current mode PWM converters, the right half plane zero still exists. In addition, current mode PWM converters utilizing pulses with about a 50% or more duty cycle created problems. The present invention, in contrast, can easily utilize such pulses. Analog controlled converters require cumbersome and complex circuitry, which is susceptible to manufacturing process variation, to utilize and harness pulses wider than 50% of the duty-cycle. Furthermore, in either analog or digitally controlled converters, it is not always easy to measure the current in the coil, which is a necessary input for precise control and stable output. The discontinuous conduction mode systems don't suffer the difficulties mentioned above for pulses greater than 50% as the coil is discharged completely before beginning of the each switching cycle, but still face loop compensation issues because of the right half plane zero. Often, to compensate the loop, the system bandwidth has to be decreased. This reduction in bandwidth affects the transient response by making it slower.

The prior PFM schemes like constant ON time or constant OFF time converters don't suffer from these loop compensation issues, but have a bigger ripple compared to PWM converters since they don't modulate the pulse width depending on the load or supply voltage.

The present invention utilizes these previously problematic pulses with more than 50% duty-cycle with a pulse frequency modulation scheme to discharge energy from the coil while retaining the pulse width modulation duty-cycle needed for a given load. Furthermore, a precise and stable output is created without the need for a precise measurement of the current in the coil.

The digital control of voltage regulators of the present invention has numerous advantages over prior systems. In a preferred embodiment, only 3 parameters are necessary to create a stable output voltage: the output voltage amplitude; the length of time that this voltage remains below or above the reference; and the speed (dv/dt) at which this voltage changes. In other embodiments of the invention, additional parameters may also be utilized. While the preferred embodiments will now be described, other embodiments and variations from that described are within the scope of the invention, which is defined by the appended claims.

The digital control system and method of the present invention may be used in many different voltage regulator topologies and configurations. The digital control of the present invention can be used in buck, boost, or buck-boost configurations, single ended primary inductor converter ("SEPIC") configurations, or inverter topologies, to name a few.

FIGS. 1A-1D illustrate various voltage regulators according to the present invention.

All of these regulators utilize digital controller 105 to control the transistor or switch 116 to provide a desired output voltage ("$V_{out}$") from a given supply voltage 118. FIG. 1A illustrates a digital regulation system configured in buck mode; FIG. 1B illustrates a digital regulation system configured in boost mode; FIG. 1C illustrates a digital regulation system configured in inverter mode; and FIG. 1D illustrates a digital regulation system configured in SEPIC mode.

Controller 105 is an integrated package and comprises four main pins. A mode pin 108, reference voltage pin 110, feed back voltage pin 112, and drive pin 114 (in addition to supply and ground pins that are not shown). In each type of regulator shown, drive pin 114 is electrically coupled to transistor 116, which switches a supply voltage 118 in order to produce a desired output voltage 120. While a direct coupling of drive pin 114 and transistor 116 is shown and preferred, other components may be present between these two elements. Also common to all of the regulators illustrated is a device 122 from which the rate of change of the output voltage over time ("dv/dt") can be determined. This device 122 is preferably a capacitor, although it is foreseen that other devices may be utilized. Various other electrical components and configurations are used to implement the regulators, and these components are well known in the art.

The buck regulator shown in FIG. 1A generates a regulated output voltage 120 which is smaller than the supply voltage 118. The boost regulator in FIG. 1B generates a regulated output voltage 120 which is greater than the supply voltage 118. The inverting buck-boost (inverter) regulator generates a regulated output voltage 120 which is inverted and the magnitude of this voltage can be lower or higher than the supply voltage 118. The SEPIC regulator also generates a regulated output voltage 120 which can be higher or lower than the supply voltage 118.

Mode selection is made with a mode selection control signal, which is input to mode pin 108. For buck, boost, and SEPIC modes the digital controller 105 generates pulses on drive output pin 114 whenever voltage on voltage feedback pin 112 is less than the voltage on the reference voltage pin 110. The polarity of these pulses are opposite in buck mode than in boost mode since in buck mode it is driving a PMOS transistor, whereas in boost and SEPIC modes it drives an NMOS transistor. In other words, in FIGS. 1A-1B, transistor 116 is preferably a PMOS type transistor (an NMOS type transistor can also be used, in that case the polarity is not reversed), whereas in FIG. 1D transistor 116 is preferably an NMOS type transistor. If inverter mode is selected, pulses are generated at drive pin 114 if the voltage at feedback pin 112 is higher than the voltage at reference voltage pin 110.

FIG. 2 illustrates an embodiment of controller 105. Controller 105 comprises an oscillator 140, which is preferably a high frequency oscillator, having for example, an 8 MHz.CLK. Oscillator 140 issues, through a divider, a 50 ns pulse every 2 μs (500 kHz). This pulse is used to load into duty cycle generator 148 a numerical value stored in an up-down digital counter (memory) 146. The period generator 144 generates more finely divided clock from the oscillator (clock) 140. The ratio of the oscillator clock frequency to the period generator clock frequency is equal to the number of levels for the duty cycle value. For example if the oscillator frequency is 8 Mhz and period generator clock frequency is 500 KHz, there would be 16 possible values for the duty cycle (8/0.5=16).

The up-down digital counter 146, is used to store and modify the pulse duty-cycle needed for a given load, output capacitor, input voltage, and temperature. It may also take into account other factors and variations in the circuitry and environment. A comparator 154 connected to a voltage reference and the output selects if the duty cycle must be widened or reduced. An algorithm generator 150 selects at which speed the up-down counter must be incremented or decremented. The duty cycle generator 148 is connected, through gating controlled by the comparator 154, to the power device (driving an inductance).

The system measures both the absolute value of the output voltage and the rate of change of this voltage ("dv/dt"). In the case of a transition to a sudden heavy load, from no load, it is preferred to regulate the voltage more quickly than it would otherwise be regulated by comparator 154. A second comparator 158, with a reference different than the first one, for example 20 mV below the first one, detects the heavy load condition and accelerates the active pulse widening. For example, if the second comparator 154 output is zero, the clock frequency to the algorithm generator is 2 μs. Hence the algorithm generator can issue a signal once every 2 μs to up-down counter to increment the duty cycle by one level. On the other hand, if the second comparator 154 output is one, the clock frequency to the algorithm generator is changed to 250 nSec, which is 8× faster. This second comparator circuitry greatly reduces the duration and magnitude of a resultant output voltage dip, as is discussed with regard to FIGS. 4 and 5.

If the output voltage tends to decrease over time, the comparator, in conjunction with algorithm generator, switches the up-down counter to UP mode thus increasing the duty-cycle. When the comparator detects that the output voltage is higher than the reference it stops sending pulses to the power device through the gating, and then switches the up-down counter to DOWN mode. In repeating this procedure (frequency modulated) bursts of pulses are sent to the power device and coil with the appropriate (pulse width modulated) duty-cycle. The coil is run in discontinuous conduction mode, so the coil discharges before the beginning of each switching cycle. The value of the coil is chosen such that the system runs in discontinuous mode. This is not specific to this invention, but it is true for all systems running in discontinuous conduction mode.

Other features are possible like detecting the state of the output load (up-down counter status) and changing the comparators bias current, which improves the efficiency (at heavy loads the comparators must be very fast and require a high bias current, whereas at low loads the speed is not important thus the bias can be reduced).

Although oscillators, up-down counters, algorithm generators, and duty cycle generators are known in the art, FIG. 3 illustrates a particular implementation of those devices. It should be understood that many different implementations are possible, and that this implementation is provided for illustrative purposes and should not limit the invention.

FIG. 4 includes three charts that illustrate operation of the present invention during a load transient from approximately 1 mA to 600 mA. The charts illustrate the major improvement in recovery time in the output voltage Vout with a device according to the present invention vs. a prior device. In the uppermost chart it can be seen that a voltage converter according to the present invention recovers from the transient significantly sooner than a standard device. In particular, after about 30 microseconds, when the transient is initiated, the output voltage in the standard design stays well below the initial level of 1.8 volts until about 60 microseconds. However, with the present invention, the initial voltage level is regained within about 10 microseconds, or approximately in ⅓ of the time of that achieved with the standard device. The middle chart illustrates the pulse train of a standard comparator, while the lowermost chart illustrates a pulse train of the present invention. While the pulse width is similar in the two devices before the transient, after the transient the pulse width and duty cycle are changed faster than in the standard device.

FIG. 5 is a larger scale version of the uppermost chart of FIG. 4, and clearly illustrates the reduced recovery time achieved with the present invention.

The invention claimed is:

1. A digital control system for controlling a switch of a voltage converter, comprising:
    a duty cycle generator that provides a duty cycle for the switch;
    a digital counter that stores a plurality of entries, wherein each entry can be input to the duty cycle generator for modifying the duty cycle in response to a varying load;
    a first comparator that compares an output voltage to a reference voltage; and
    an algorithm generator distinct from the duty cycle generator, digital counter, and first comparator, the algorithm generator producing an algorithm that determines the rate of change for modifying the duty cycle;
    wherein if the first comparator detects that the output voltage is higher than the reference voltage, the algorithm generator affecting the input of entries from the digital counter into the duty cycle generator, thereby adjusting the rate of change for modifying the duty cycle of the switch.

2. The system of claim 1 further comprising a second comparator having a reference different than the first comparator.

3. A method for digitally controlling a switch of a voltage converter, comprising:
    providing a duty cycle for the switch with a duty cycle generator;
    storing a plurality of entries in a digital counter, wherein each entry can be input to the duty cycle generator for modifying the duty cycle in response to a varying load;
    compares an output voltage to a reference voltage with a first comparator; and
    producing an algorithm that determines a rate of change for modifying the duty cycle with an algorithm generator, wherein the algorithm generator is distinct from the duty cycle generator, digital counter, and first comparator;
    wherein if the output voltage is detected to be higher than the reference voltage, affecting the input of entries from the digital counter into the duty cycle generator with the algorithm generator, thereby adjusting the rate of change for modifying the duty cycle of the switch.

* * * * *